US005880801A

United States Patent [19]
Scherer et al.

[11] Patent Number: 5,880,801
[45] Date of Patent: Mar. 9, 1999

[54] HYBRID ALIGNED LIQUID CRYSTAL DISPLAY EMPLOYING AN ANODIZED ALIGNMENT LAYER AND METHOD FOR FABRICATION

[75] Inventors: Axel Scherer, Laguna Beach; Jean-Jacques P. Drolet; Demetri Psaltis, both of Pasadena, all of Calif.

[73] Assignee: California Institute of Technology, Pasadena, Calif.

[21] Appl. No.: 612,382

[22] Filed: Mar. 7, 1996

[51] Int. Cl.$^6$ .................................................. G02F 1/1337
[52] U.S. Cl. ........................... 349/124; 349/130; 349/128
[58] Field of Search .................... 349/187, 124, 349/130, 128

[56] References Cited

U.S. PATENT DOCUMENTS 5,054,889 10/1991 Imanishi et al. ......................... 349/136

FOREIGN PATENT DOCUMENTS 2-208633 8/1990 Japan .
3-139615 6/1991 Japan .

OTHER PUBLICATIONS

J.L. Ferguson. Polymer encapsulated nematic liquid crystals for display and light control applications. Information Display Digest, pp. 68–70, 1985.

Paul S. Drzaic. Reorientation dynamics of polymer dispersed nematic liquid crystal films. Liquid Crystals, 3(11):1543–1559, 1988.

G. Paul Montgomery. Polymer-dispersed liquid crystal films for light control applications. Proceedings of the SPIE, 1080:242–249, 1989.

M. Saito, S. Nakamuira, and M. Miyagi. Light scattering by liquid crystals in columnar micropores. Journal of Applied Physics, 75(9):4744–4746, May 1994.

M. Saito, D. Tobise, and M. Miyagi. Optical loss anisotropy of alumina films that contain liquid crystals. Optical Engineering, 34(12):3554–3559, Dec. 1995.

Y. Kawata, H. Takatoh, M. Hasegawa, and M. Sakamoto. The alignment of nematic liquid-crystals on photolithographic micro-groove patterns. Liquid Crystals, 16(6):1027–1036, 1994.

*Primary Examiner*—William L. Sikes
*Assistant Examiner*—Kenneth Parker
*Attorney, Agent, or Firm*—Michaelson & Wallace; Edmond DeFrank; Christopher R. Balzan

[57] ABSTRACT

The present invention discloses nanomechanical fabrication methods of hybrid aligned nematic (HAN) cells of liquid crystals for creating analog spatial light modulators and smart pixel arrays on conventionally fabricated VLSI integrated circuits. The liquid crystal material is encapsulated between a top substrate and a bottom substrate. The locally averaged direction of the long axis of the molecules of liquid crystals of the HAN cells varies smoothly from homogeneous alignment on a top substrate to homeotropic alignment on a bottom substrate. The bottom substrate causes a homeotropic alignment of the liquid crystal because of its porous microstructure.

46 Claims, 3 Drawing Sheets

HYBRID ALIGNED LIQUID CRYSTAL DISPLAY EMPLOYING AN ANODIZED ALIGNMENT LAYER AND METHOD FOR FABRICATION

BACKGROUND OF THE INVENTION

1. Field of the Invention

The present invention relates, in general, to the alignment of liquid crystals, and in particular to the homeotropic alignment of liquid crystals on porous materials.

2. Related Art

Liquid crystal is a substance that behaves like both a liquid and a solid. Although the molecules in liquid crystals move past each other relatively easily, similar to molecules in the liquid, all the molecules in a microscopic neighborhood in a liquid crystal are oriented in a similar manner as a solid crystal. Liquid crystals do not melt directly to the liquid phase but instead, first pass through a paracrystalline stage in which the molecules are partially ordered. In this stage, the liquid crystal is a cloudy or translucent fluid but has some of the optical properties of a solid crystal.

There are several classes of liquid crystals. These classes include nematic, various kinds of smectic phases, and cholesteric. Each is characterized by a different spatial arrangement of the molecules and is designated by the alignments of their molecules. Typical nematic types of liquid crystal have rodlike elongated molecules oriented parallel to one another without a layer structure. Although nematic liquid crystals have little positional ordering or layering, nematic liquid crystals have strong orientational ordering. In smectic liquid crystals, the rodlike molecules are positioned in a parallel manner with respect to one another, thereby forming a layer. Nevertheless, within the formed layer, only a small periodic patterns exists. The cholesteric types of liquid crystals have their rodlike molecules parallel to one another. The molecules are arranged in a helical or spiral fashion.

The alignment of the molecules in the particular liquid crystal is very important in producing properly functioning devices utilizing liquid crystals. The spatially varying orientation of the liquid crystal molecules can be affected by external stimuli such as electric or magnetic fields, temperature, and mechanical stress. This gives rise to useful optical effects such as polarization guiding and variable (and controllable) phase retardation or scattering. Liquid crystals are used to construct displays used in digital watches, calculators, miniature television sets, as well as large, flat projection screens, liquid-crystal computer displays for portable computers, and other items.

In addition, liquid crystals are being used increasingly in optical devices. Proper alignment of liquid crystals used in optical devices is very desirable. These devices include optical information storage and processing systems, optoelectronic neuromorphic systems, liquid crystal displays, and electrically programmable diffractive optical elements and beam shaping devices.

There are two main types of liquid crystal alignment, namely homogeneous liquid crystal alignment and homeotropic liquid crystal alignment. Homogeneous liquid crystal alignment is the most common alignment technique presently used. This type of alignment is typically used in twisted nematic liquid crystals for consumer electronics and other related products. A locally averaged direction of the elongated molecules' (is a unit vector referred to as a "director") is aligned parallel to the surface of the substrate.

In homeotropic liquid crystal alignment, the director is aligned perpendicular to the surface of the substrate. In other words, the elongated rodlike molecules have their long axis perpendicular to the surface of the substrate. Current methods for providing homeotropic alignment of liquid crystals include spinning and baking chemical surface coupling agents, such as silane compounds, on the substrate or glass.

For example, certain chemicals, such as octadecyltriethoxysilane (OTS), provide homeotropic alignment of the neighboring liquid crystal molecules when spun on a glass substrate or on indium-tin-oxide (ITO).

However, current alignment methods of liquid crystals are not suitable for all devices requiring homogeneous and homeotropic alignment, including conventionally fabricated VLSI integrated circuits, such as analog spatial light modulators and smart pixel arrays.

Therefore what is needed is a new method for achieving homeotropic alignment of liquid crystals, particularly on semiconductor dies and wafers, optoelectronic integrated circuits and the like. What is also needed is a cost effective and practical homeotropic alignment technique of liquid crystals for various optical devices and semiconductor die and wafer devices that does not require rubbing the semiconductor die or performing oblique evaporations. What is further needed is a method for creating hybrid aligned nematic cells on semiconductor dies and wafers, optoelectronic integrated circuits and the like. What is further needed is a homeotropic alignment method compatible with aluminum electrodes allowing liquid crystal devices to be fabricated on the surface of integrated circuits.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a new method of homeotropic alignment of liquid crystals, and is embodied by new hybrid aligned nematic cell devices. The new homeotropic alignment method of liquid crystals can be achieved in the invention on porous materials, such as porous anodic aluminum oxide.

Specifically, an alignment film, such as a porous film, is formed on a substrate made of or coated with aluminum by anodizing it in an acidic environment, such as an acidic electrolyte under suitable conditions. This forms a layer of porous aluminum oxide on the surface of the substrate. The pores of the aluminum oxide are elongated and have their long axis approximately normal or perpendicular to the surface of the substrate. The diameter of the elongated pores can vary depending on the anodization process and acidic electrolyte used.

Next, liquid crystal, such as nematic liquid crystal, is put in contact with the surface of the substrate to eventually achieve homeotropic alignment of the liquid crystal. This alignment is achieved by a combination of the interaction between the aluminum oxide's pore walls and of the elastic behavior of nematic liquid crystals. Within the aluminum oxide pores, the liquid crystal molecules tend to align so that the elastic deformation energy of the embedded liquid crystals is minimized. This energy is minimized when the director, (the locally averaged direction of the long axis), is parallel to the walls of the pores, or perpendicular to the surface of the substrate. This homeotropic alignment is carried to some extent to the bulk of the nematic film by bulk elasticity.

In addition, the present invention is embodied by hybrid aligned nematic (HAN) cells for producing analog spatial light modulators and smart pixel arrays on integrated circuits. The HAN liquid crystal cells are built using a bottom substrate inducing homeotropic alignment of liquid crystals and a top substrate inducing homogeneous alignment of liquid crystals. The locally averaged orientation of the long axis of the liquid crystal molecules varies smoothly from homogeneous alignment on the top substrate to homeotropic alignment on the bottom substrate. The bulk of the nematic film is affected by both substrates.

In a reflective cell, the top substrate, such as a cover glass plate, is coated for example with a transparent electrode and a material suitable to induce homogeneous alignment of the liquid crystal molecules. The bottom substrate is a porous material, such as aluminum, and is partially anodized. The remaining aluminum under the oxide is used as an optical mirror and as an electrode for applying a voltage across the cell, thereby defining pixels. Competition is created between the homogeneous alignment induced by the cover plate and the homeotropic alignment induced by the porous aluminum oxide. The competing effects of the two types of alignment induced by the substrates in conjunction with the elasticity of the nematic material, cause a splay-bend conformation (smooth transition) of the nematic bulk. Thus, the HAN cell has strong homeotropic alignment near the bottom substrate induced by the porous aluminum oxide, strong homogenous alignment near the top substrate, and a smooth transition between the two substrates.

This technique can be used for fabricating liquid crystal modulators on VLSI die and wafers. For instance, a liquid crystal modulator can be produced as a hybrid aligned nematic cell. Specifically, aluminum electrodes fabricated by the VLSI process are partially anodized to form a thin layer of porous aluminum oxide on top of the remaining thickness of aluminum. The porous oxide layer provides strong homeotropic alignment of the neighboring liquid crystal, while the original aluminum electrode under it is employed to apply voltages across the pixel structure and to reflect incoming optical readout beams. The other substrate can be a glass plate with a transparent electrode and rubbed polyimide. Compared to devices with pure homogeneous alignment (parallel-rubbed or twisted cells), the hybrid-aligned nematic cells of the present invention do not exhibit a marked threshold voltage for the onset of electrically-controlled phase retardation. In contrast, an electro-optic response from the HAN cells of the present invention is obtained at very low voltages.

An object of the present invention is to provide homeotropic alignment on porous materials to produce a HAN cell for integrated circuits. A feature of the present invention is to provide homeotropic alignment with aluminum metalization layers used in typical integrated circuits. Another feature of the present invention is liquid crystal devices compatible with aluminum to allow their fabrication on the surface of integrated circuits. A further feature of the present invention is a natural means for providing homeotropic alignment of liquid crystal on the surface of the integrated circuit.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
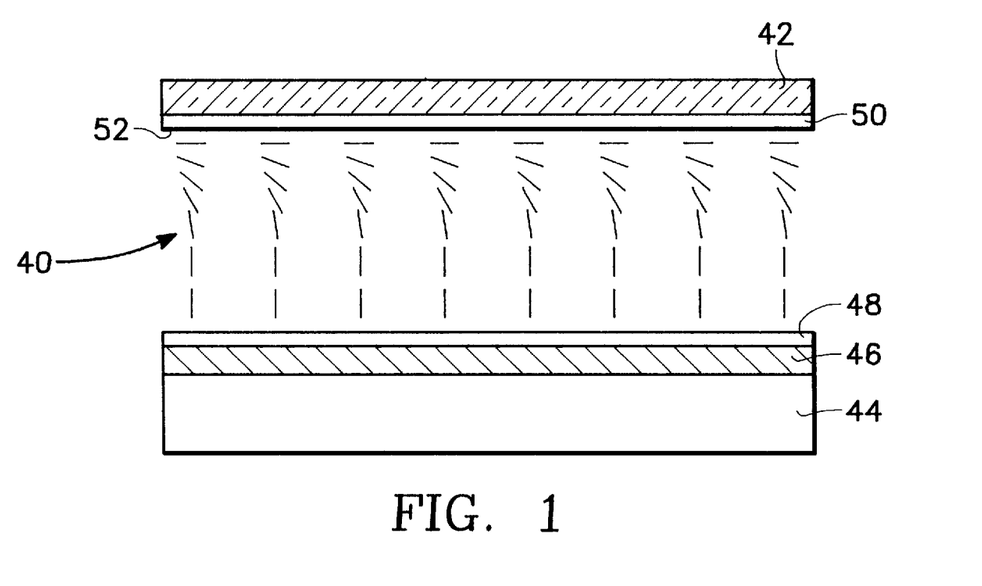
FIG. 1 illustrates a cross sectional view of the behavior of liquid crystal molecules of a hybrid aligned nematic cell on a VLSI modulator fabricated in accordance with the present invention.

FIG. 1 illustrates a cross sectional view of the behavior of the liquid crystal molecules of the HAN cell on a VLSI modulator fabricated in accordance with the present invention.

As shown in FIG. 1, the HAN devices of the present invention are fabricated by encapsulating the liquid crystal material 40 between a top substrate 42, such as a glass cover plate, and a bottom substrate 44, such as a processed silicon VLSI chip with an aluminum pad 46. Parallel or homogeneous alignment is obtained on the cover glass substrate by coating it with a transparent conductor 50, such as indium-tin-oxide (ITO), and a uniaxially rubbed polymer 52, such as polyimide.

Homeotropic Alignment Induced by the Nanostructure of a Substrate

Figure 2:
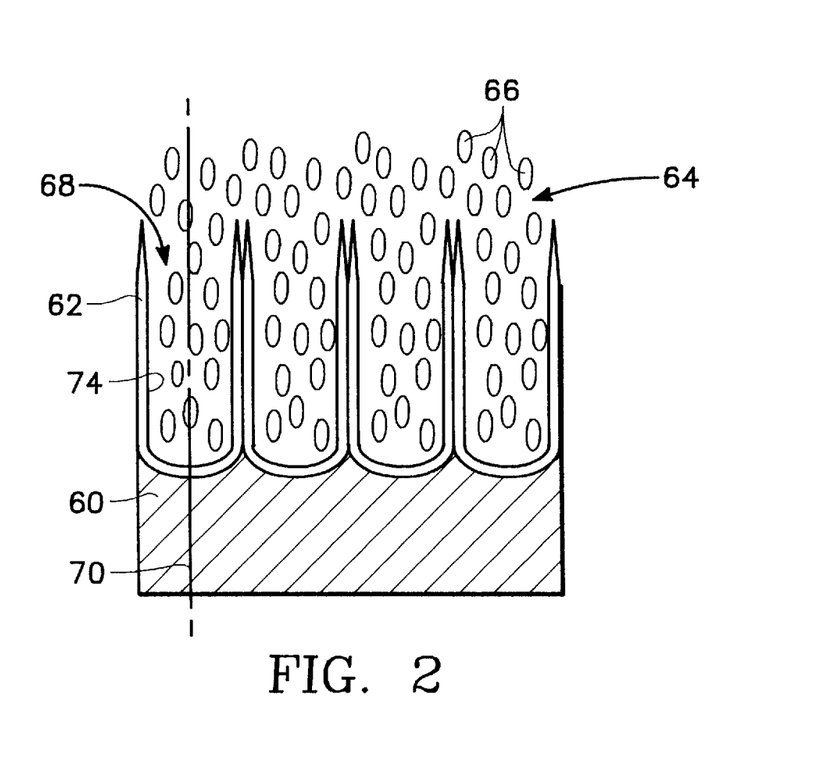
FIG. 2 illustrates an exploded view of a porous material inducing homeotropic alignment of liquid crystals in accordance with the present invention.

The anodic oxidation of the aluminum of an integrated circuit in a strongly acidic environment can induce homeotropic alignment. Homeotropic alignment is induced on the silicon wafer without affecting the electronic performance of the device. FIG. 2 illustrates an exploded view of a material 60 with a porous film 62, such as aluminum with porous aluminum oxide, inducing homeotropic alignment 64 of liquid crystals 66 in accordance with the present invention. In an acidic electrolyte, for example, the aluminum 60 is anodized to produce the formation of a film of highly porous aluminum oxide 62, where the elongated microscopic pores 68 have their long axis 70 perpendicular to the surface 72 of the aluminum 60. Nematic liquid crystals 66 placed in contact with such a porous medium 62 can penetrate the pores 68, and be homeotropically oriented through a combination of bulk elasticity and surface interaction with the walls of the pores 74.

The diameter of the elongated pores can vary and the depth of the elongated pores 68 can be up to several micrometers and optimized for optimal alignment, depending on the anodization process, acidic electrolyte used, and by the anodization time.

The nematic liquid crystals 66 are placed in contact with the pores 68 to effectuate homeotropic alignment of the liquid crystals 66. The combination of the interaction between the nematic liquid crystals 66 and the pore walls 74, and of the elastic behavior of nematic liquid crystals 66 produces the desired alignment. Specifically, the elongated molecules of the nematic liquid crystals tend to orient themselves within the pores 68 so that a minimum amount of deformation energy is endured by the liquid crystals. Consequently, since the elastic deformation energy of the embedded liquid crystals 66 is minimized when the director is parallel to the walls 74 of the pores 68, or perpendicular to the surface 72 of the substrate 60, homeotropic alignment is achieved. This homeotropic alignment is carried, to some extent, to the bulk of the nematic film by bulk elasticity.

Figure 3:
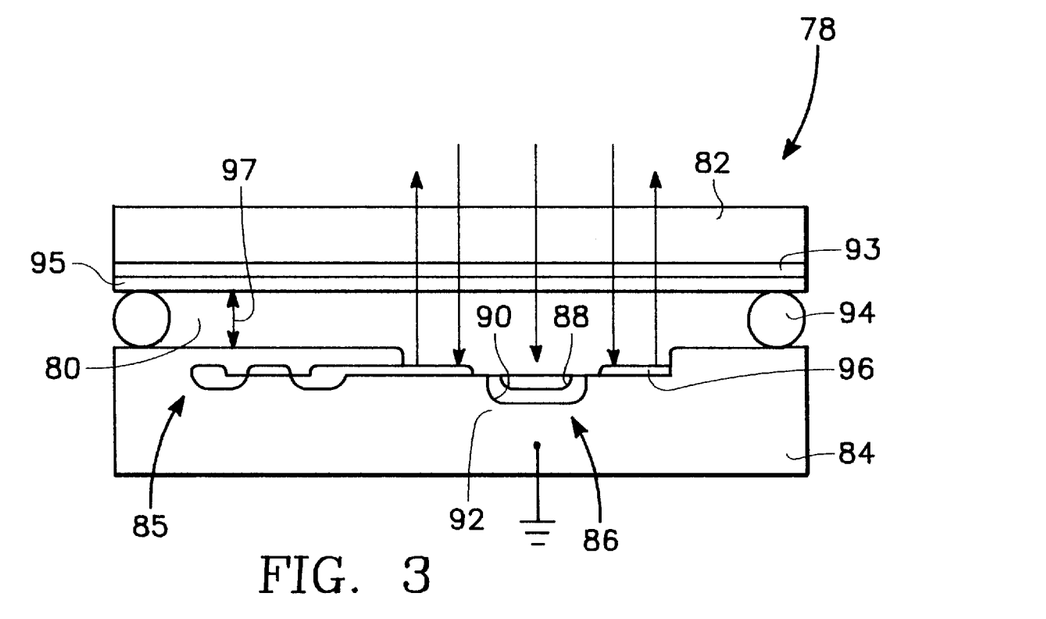
FIG. 3 illustrates a hybrid aligned nematic cell fabricated in accordance with the present invention.

FIG. 3 illustrates a cross sectional view of a liquid-crystal-on-silicon (LCOS) optoelectronic device fabricated in accordance with the present invention. The LCOS device 78 has liquid crystal 80 located between a top substrate 82 and a bottom substrate 84. The bulk of the nematic film 80 is affected by both the top substrate 82 and the bottom substrate 84. The top substrate 82 can be of many types, such as, for example, a glass cover plate coated with a transparent electrode covered with rubbed polyimide as described in FIG. 1 above. The bottom substrate can be silicon with anodized aluminum, as discussed above, to form a layer of porous aluminum oxide 48. The bottom substrate can also be a glass slide with a 2 μm thick coating of evaporated aluminum, partially anodized in a sulfuric acid bath.

Spatial Light Modulators and Smart Pixel Arrays in the form of HAN-on-VLSI Modulators Referring to FIG. 3, a cross sectional view of a liquid-crystal-on-silicon (LCOS) optoelectronic device of with the present invention is illustrated. HAN cell devices of the present invention include spatial light modulators, smart pixel arrays and beam steerers. Applications of the these HAN cells include volume holographic memories, optical disk data storage, optical neural networks, displays and programmable diffractive optical elements.

Active-matrix addressing circuitry for liquid crystal pixels can be fabricated on the silicon integrated circuit 84 containing aluminum layers. Once the silicon chip 84 has been processed by the conventional VLSI procedures, the silicon chip 84 is immersed in an acid bath, such as sulfuric acid or other suitable acid. The acid bath anodizes and forms pores in the aluminum contained on the integrated circuit 84. The silicon integrated circuit can, for example, consist of an array of smart pixels. Each smart pixel can contain photodetectors, such as a phototransistor 86 (with a p+ emitter 88, an n-well base 90 and a p collector 92), information processing circuitry (represented by MOSFET 85), and partially anodized aluminum electrode 96.

Specifically, a glass plate 82 coated with the transparent electrode 93 and an alignment layer 95 is first affixed to the VLSI die 84, with for example, a cured mixture of epoxy. The glass plate is maintained at a microscopic distance above the silicon die 84 by microscopic spacers 94, thereby defining a gap 97. Chopped glass fiber or polystyrene beads, with diameters ranging from 4 μm to 10 μm, can be used as spacers 94. The gap is between the die 84 and the glass plate 82 and is filled with a liquid crystalline substance 80, capable of analog phase or amplitude modulation with external polarizers.

The LCOS optoelectronic device 78 is divided into pixels by the circuitry underlying the liquid crystal layer. Metal electrodes 96 act as mirrors and simultaneously apply local electric fields across the liquid crystal cell. The alignment method of the present invention uses electrodes 96 made of a metalization level native to the conventional VLSI fabrication process both optically, as mirrors, and electrically, to apply local fields across the nematic film, to define the pixels (picture elements). The aluminum of the topmost metalization level can usually be selectively exposed to the acidic anodizing solution. Thus, it is possible to cover the entire surface of the die 84 with a passivation layer, except for electrodes assigned to driving liquid crystals and bonding pads. The remaining aluminum under the aluminum oxide on the bottom substrate is used as an optical mirror and as an electrode for applying a voltage across the cell, thereby defining the pixels. Competition is created between the homogeneous alignment induced by the top substrate 82 and the homeotropic alignment induced by the bottom substrate 84. The competing effects of the two types of alignment on the substrates 82 and 84 cause a splay-bend conformation of the nematic bulk.

More specifically, for homeotropic alignment, the aluminum metallic electrodes assigned to driving the pixels can be selectively anodized by immersing the die, or an entire wafer, in an acidic electrolyte bath. An ionic current is circulated between the die and the metallic electrodes, thereby forming a layer of porous aluminum oxide on top of each pixel. Each pixel is only partially anodized, and the remaining aluminum can be employed for reflecting optical signals and for applying electric fields across the nematic film. This procedure can be performed on the die, or wafer, immediately after the conventional VLSI fabrication, and before the cover plate is affixed to it.

Next, the die is heated above a clearing point or approximately 70 degrees celsius. The liquid crystal is then injected into the cavity and flows within the cavity by capillary driven action. Because of the temperature at which the operation is performed, the liquid crystal is in the isotropic phase. The die 84 is then allowed to slowly cool down and equilibrate, thereby going through the isotropic to the nematic phase transition at which point the liquid crystals are aligned.

Competition is created between the homogeneous alignment induced by the top substrate 82 and the homeotropic alignment induced by the bottom substrate 84 (the partially anodized electrode 96). The competing effects of the two types of alignment on the substrates 82 and 84 cause a splay-bend conformation of the nematic bulk. As a result, the liquid crystal molecules vary smoothly from homogeneous alignment, near the top substrate 82, to homeotropic alignment, near the bottom substrate 84, as shown in detail in FIG. 1. Thus, the HAN cell produced has strong homeotropic alignment near the bottom substrate, induced by the porous aluminum oxide, as well as strong homogeneous alignment near the top substrate.

An important advantage of the LCOS optoelectronic device is its suitability for the fabrication of the smart pixel arrays as discussed above. The smart pixel arrays have some local information processing circuitry associated with each pixel, in addition to the basic driving electronics. The smart pixel array processing circuitry is easily integrated on the standard VLSI chip of the present invention.

The LCOS optoelectronic devices can be fabricated in the form of hybrid aligned nematic cells on very large scale integrated circuit (HAN-on-VLSI) modulators in accordance with the nanomechanical process mentioned above.

In addition, HAN cells on-VLSI integrated circuits, including spatial light modulators and smart pixel arrays fabricated in accordance with the present invention, provide true gray scale or continuous phase modulation while requiring only a small amount of simple post-processing procedures. The devices fabricated in accordance with the present invention have high yields, low costs, a high degree of reliability, and are suitable for large scale fabrication.

Figure 4:
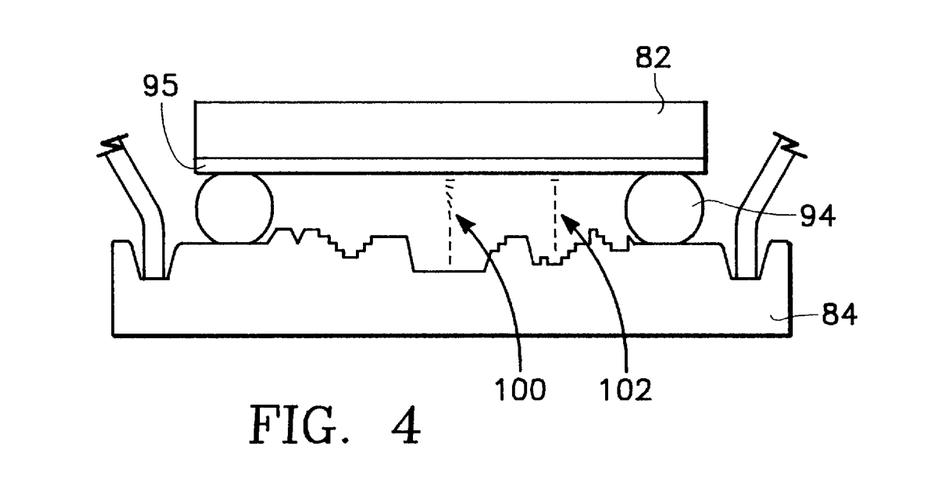
FIG. 4 illustrates a cross sectional view of an optoelectronic integrated circuit (OEIC) fabricated in accordance with the present invention.

FIG. 4 illustrates the smooth variation or rotation of the nematic director of the liquid crystal molecules in the HAN cell fabricated between two substrates in accordance with the present invention. This hybrid alignment varies smoothly from homogeneous alignment on the top substrate to homeotropic alignment on the bottom substrate.

When no electric field is applied across the cell, the orientation of the director 100 of the molecules varies smoothly from homogeneous alignment near the cover plate 82 to homeotropic alignment on the surface of the die 84.

Using the Frank elasticity theory, and assuming strong anchoring at both substrates, it can be shown that the angle (in radians) between the nematic director and the vertical axis (perpendicular to the substrates), $\phi(z)$, is given (implicitly) by the well known expression:

$$\frac{1}{d}\left(z + \frac{d}{2}\right) = \frac{\int_0^{\phi(z)} \sqrt{K(x)dx}}{\int_0^{\frac{\pi}{2}} \sqrt{K(x)dx}} \tag{1}$$

where d is the cell gap or the distance between the two substrates, $z = -d/2$ on the surface of the chip, and $$K(\phi) = K_3(1 - h\sin^2(\phi)) \tag{2}$$

where $$h \equiv 1 - \frac{K_1}{K_3} \tag{3}$$

and $K_1$ and $K_3$ are the splay and bend elastic coefficients of the mesophase, respectively. In the one-constant approximation, where $K_1 \approx K_3$, the angle between the director and the vertical is approximately a linear function of distance, as expressed by the well known expression:

$$\phi(z) \approx \frac{\pi}{2d}\left(z + \frac{d}{2}\right) \tag{4}$$

The resulting phase retardation between the eigenmodes of a normally incident plane wave is:

$$\Delta\phi = \frac{2\pi n_o d}{\lambda}\left(\frac{2}{\pi}\int_0^{\pi/2} \frac{d\phi}{\sqrt{1 - R\sin^2\phi}} - 1\right) \tag{5}$$

where $\lambda$ is the wavelength of the beam in vacuum, and $n_o$ and $n_e$ are the ordinary and extraordinary indices of refraction of the liquid crystal, respectively.

$$R \equiv 1 - \frac{n_o^2}{n_e^2}, \tag{6}$$

When a field is applied, the director 102 of the molecules tend to align with the field. In the high-field limit, the director is perpendicular to the substrates throughout the cell, except for a thin film in the immediate vicinity of the cover plate. There is practically no phase retardation between the eigenmodes of a normally incident plane wave. The index of refraction seen by light polarized along the buffing direction of the cover plate can be continuously changed by applying analog voltages across the cell. Given a suitable input light polarization, this phase modulation can easily be converted into amplitude modulation with the aid of a polarizer.

Thus, HAN modulators fabricated in accordance with the present invention provide true gray scale amplitude modulation or continuous phase modulation, a desirable and important property in many applications. Because nematic liquid crystals are inherently easier to align than ferroelectric liquid crystals typically used currently, the HAN cells of the present invention utilizing nematic liquid crystals provide better alignment quality, and a better contrast and light efficiency.

In addition, the HAN-on-VLSI technology of the present invention allows the use of thicker cells, such as a cell thickness on the order of 4 $\mu$m to 10 $\mu$m. This reduces the effect of the bumpiness or the roughness of the surface of the integrated circuit. Also, the turn-on time of the HAN-on-VLSI modulators of the present invention is a field-driven process that can be made faster by increasing the applied field.

Figure 5:
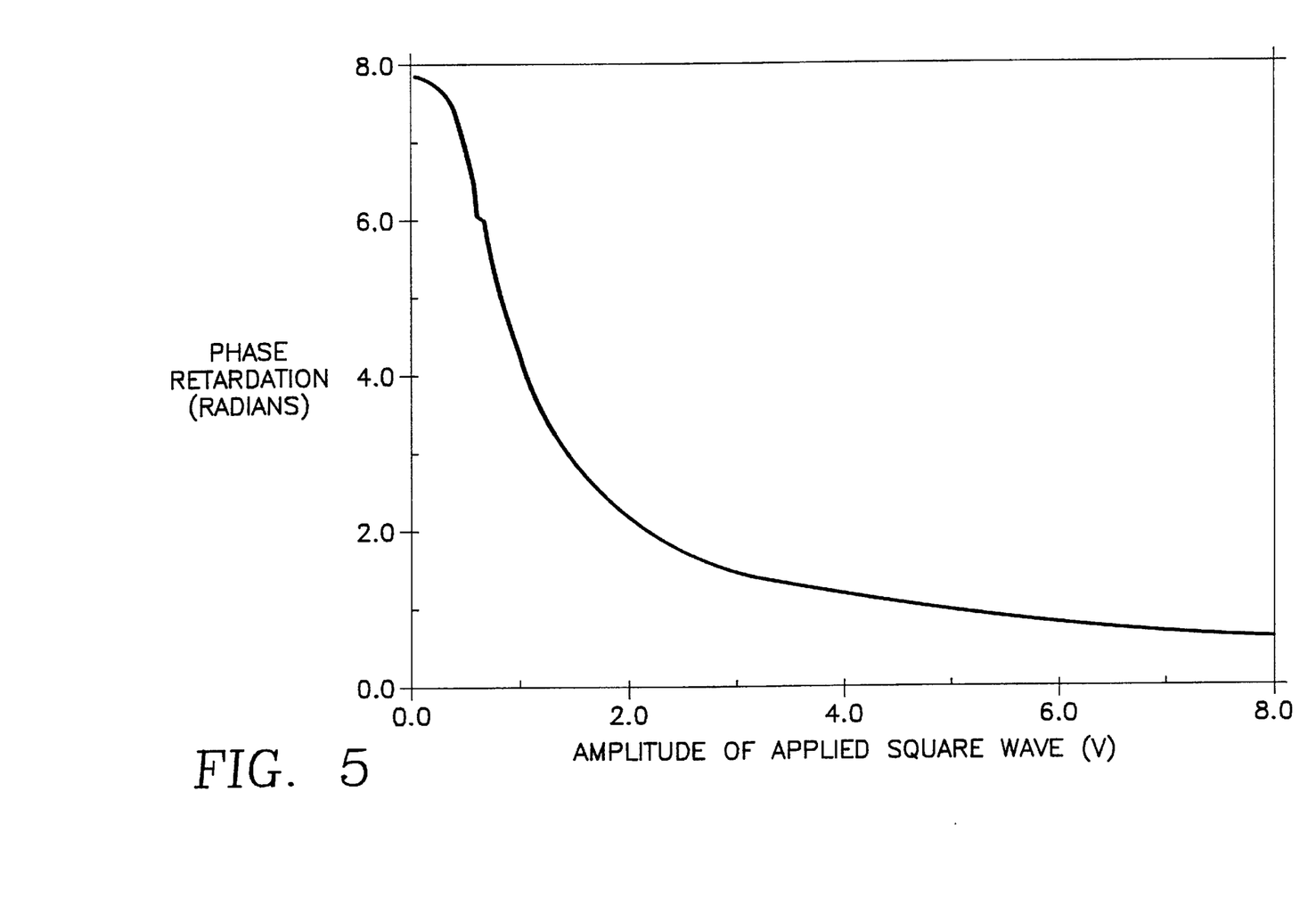
FIG. 5 shows the measured electro-optic response of a HAN cell fabricated in accordance with the nanomechanical methods of the present invention.

FIG. 5 shows the measured electro-optic response of a HAN cell fabricated in accordance with the nanomechanical methods of the present invention. The phase retardation of the device, illuminated by a collimated beam of wavelength 632.8 nm, is plotted as a function of the amplitude of the DC-balanced square wave applied between its electrodes. The phase retardation of the undriven device is within 5.4% of the value predicted by theory (Equation 6).

It should be noted that the HAN cell devices of the present invention are comprised preferably of nematic liquid crystals instead of smectic liquid crystals. This is because nematic liquid crystals are inherently easier to align properly than smectic liquid crystals.

Also, nematic liquid crystals can accommodate larger cell gaps than smectic liquid crystals. As a result, nematic liquid crystals can reduce the influence of imperfections on device performance. In addition, nematic liquid crystals in the HAN conformation also naturally offer analog phase and amplitude modulation at low voltages, which are more difficult to obtain with smectic liquid crystals.

However, the use of a porous film on a planar substrate to align other types of liquid crystals, such as smectics, and other anisotropic molecules can also be achieved. Moreover, porous materials other than anodic aluminum oxide can also be used.

The HAN devices fabricated in accordance with the present invention avoid the need for complex processing, such as planarization or epitaxial lift-off or oblique evaporation. Moreover, it is believed for several applications, that the fabrication methods of the present invention are better suited for the fabrication of smart spatial light modulators instead of the thin-film transistor (TFT) technology currently used in many of the high-end display market. The reflective devices of the present invention employ mature VLSI technology, including MOSFETs fabricated on crystalline silicon having high yield and density.

The preferred embodiment described above is for reflective devices. It is also possible to employ the disclosed invention in transmissive modulators by allowing the reaction to transform the entire aluminum layer into porous aluminum oxide. Since aluminum oxide is an excellent insulator, a transparent electrode must be provided behind the aluminum layer.

For example, transmissive devices can be fabricated by first depositing a transparent electrode behind the aluminum and then anodizing the entire layer of aluminum. This will force the liquid crystal into homeotropic alignment.

APPLICATIONS

Potential applications of the disclosed invention include optical information storage and processing systems, optoelectronic neuromorphic systems, displays, and electrically programmable diffractive optical elements and beam shaping devices. Devices fabricated in accordance with the present invention include reflective liquid crystal-on-silicon (LCOS) spatial light modulators and smart pixel arrays capable of analog phase and amplitude modulation at low driving voltages, and electrically programmable high-resolution beam steering devices. The smart spatial light modulators with active-matrix addressing can be employed to imprint a two-dimensional data page on an optical beam, with applications in displays, optical memories, optical computing, optoelectronic neuromorphic systems and programmable diffractive optical elements. The applications of the beam steerers include addressing volume holographic memories, printing, large format alphanumeric displays and the deflection of beams for track addressing in optical disk systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device having homeotropically aligned liquid crystals with respect to a surface of a substrate of said device, said device comprising:
    a film coating on said surface of said substrate;
    wherein said film is partially anodized in an acidic environment to form a porous layer on said film, said porous layer having elongated pores, each pore having a longitudinal axis, each of said longitudinal axes of said elongated pores being perpendicular to said surface of said substrate; and
    a liquid crystal material comprised of elongated molecules having a first portion overlying said porous layer, and a second portion residing within said elongated pores so that said elongated molecules are homeotropically aligned with respect to said surface of said substrate.

2. The invention as set forth in claim 1, wherein said liquid crystal is nematic liquid crystal.

3. The invention as set forth in claim 1, wherein said acidic environment is an acidic electrolyte.

4. The invention as set forth in claim 1, wherein said film is aluminum and said layer is porous aluminum oxide.

5. The invention as set forth in claim 1, wherein the diameter of the elongated pores is between the range of ten nanometers to three hundred nanometers.

6. The invention as set forth in claim 1, wherein the depth of the elongated pores is 1.5 micrometers.

7. The invention as set forth in claim 1, further comprising a top substrate overlying said film coating and said first portion of said liquid crystal material.

8. The invention as set forth in claim 7, wherein said elongated molecules of said first portion near said top substrate are homogeneously aligned.

9. A method for creating homeotropic alignment, with respect to a surface of a substrate, of liquid crystals within a porous material, comprising the steps of:
    (a) coating said substrate with an aluminum film;
    (b) partially anodizing said film in an acidic environment to form a porous layer having elongated pores in a top region of said aluminum film, wherein each elongated pore has a longitudinal axis, and each of said longitudinal axes of said elongated pores are perpendicular to said surface of said substrate; and
    (c) depositing liquid crystal material comprised of elongated molecules onto said porous layer, whereby said liquid crystal flows into said elongated pores by capillary action so that said elongated molecules homeotropically align within said elongated pores, with respect to said surface of said substrate.

10. The invention as set forth in claim 9, wherein said liquid crystal is nematic liquid crystal.

11. The invention as set forth in claim 9, wherein said acidic environment is an acidic electrolyte.

12. The invention as set forth in claim 9, wherein said layer is porous aluminum oxide.

13. The invention as set forth in claim 9, further comprising forming said elongated pores with a diameter in the range of 10 nm to 300 nm.

14. The invention as set forth in claim 9, further comprising the steps of placing a top substrate over said film coating and said first portion of said liquid crystal material and inducing, near said top substrate, homogeneous alignment of said elongated molecules of said first portion with respect to said top substrate.

15. A hybrid aligned nematic cell on an integrated circuit, comprising:
    a top substrate having an alignment film;
    a bottom substrate located on said integrated circuit;
    wherein said bottom substrate is anodized in an acidic environment to form a porous layer on said film, said porous layer having elongated pores, each pore having a longitudinal axis, each of said longitudinal axes of said elongated pores being perpendicular to said surface of said substrate;
    a liquid crystal material comprised of elongated molecules having a first portion near said top substrate and overlying said porous layer, and a second portion residing within said elongated pores so that said elongated molecules are homeotropically aligned with respect to said surface of said substrate; and
    wherein said elongated molecules of said first portion near said top substrate are homogeneously aligned with respect to said alignment film and wherein said homogeneously aligned elongated molecules near said top substrate vary smoothly in a splay-bend conformation to homeotropic alignment at said bottom substrate.

16. The invention as set forth in claim 15, further comprising spacers affixed to said bottom substrate so that said top substrate is a spaced apart distance from said bottom substrate.

17. The invention as set forth in claim 15, wherein said hybrid aligned nematic cell is an analog spatial light modulator fabricated on said integrated circuit.

18. The invention as set forth in claim 15, wherein said top substrate is a cover glass plate coated with a transparent electrode.

19. The invention as set forth in claim 18, wherein said transparent electrode is covered with rubbed polyimide.

20. The invention as set forth in claim 15, wherein said layer formed on said bottom substrate is partially anodized aluminum oxide.

21. The invention as set forth in claim 20, wherein said partially anodized aluminum has a remaining portion of aluminum defining metal electrodes that optically reflect light incident on said metal electrodes.

22. The invention as set forth in claim 21, wherein said metal electrodes are also contacts for applying voltages across said hybrid aligned nematic cell, thereby defining pixels having local processing functions.

23. The invention as set forth in claim 21, wherein said metal electrodes simultaneously apply local electric fields across said hybrid aligned nematic cell and optically reflect light incident on said metal electrodes.

24. A method for creating a hybrid aligned nematic cell on an integrated circuit, comprising the steps of:
   (a) anodizing a bottom substrate in an acidic environment to form a porous layer having elongated pores in a top region of said bottom substrate, wherein each elongated pore has a longitudinal axis, and each of said longitudinal axes of said elongated pores are perpendicular to said surface of said bottom substrate;
   (b) placing a top substrate over said bottom substrate, thereby forming a cavity;
   (c) depositing liquid crystal comprised of elongated molecules between said top substrate and said bottom substrate into said cavity and onto said porous layer, whereby said liquid crystal flows into said elongated pores by capillary action so that said elongated molecules homeotropically align within said elongated pores, with respect to said surface of said substrate; and
   (d) inducing homogeneous alignment of said liquid crystals near said top substrate.

25. The invention as set forth in claim 24, further comprising, after the step of placing a top substrate over said bottom substrate, the step of affixing spacers to said bottom substrate so that said top substrate is a spaced apart distance from said bottom substrate, thereby defining a cavity.

26. The invention as set forth in claim 24, wherein said layer of said bottom substrate is partially anodized aluminum oxide.

27. The invention as set forth in claim 26, wherein said partially anodized aluminum has a remaining portion of aluminum defining metal electrodes that optically reflect light incident on said metal electrodes.

28. The invention as set forth in claim 27, wherein said metal electrodes are also contacts for applying voltages across said hybrid aligned nematic cell, thereby defining pixels having local processing functions.

29. The invention as set forth in claim 27, further comprising the steps of simultaneously applying and reflecting local electric fields across said hybrid aligned nematic cell and reflecting optically light incident on said metal electrodes.

30. The invention as set forth in claim 29, further comprising the step of exposing selectively said aluminum so that the entire surface of said integrated circuit is covered with a passivation layer, except for said metal electrodes assigned to driving said pixels.

31. The invention as set forth in claim 24, further comprising the step of selectively anodizing said metal electrodes driving respective pixels by immersing said bottom substrate in an acidic electrolyte bath and circulating an ionic current between said bottom substrate and an external metal electrode, whereby a layer of porous aluminum oxide is formed on a top side of each metal electrode associated with individual pixels.

32. The invention as set forth in claim 24, further comprising, after the step of anodizing said bottom substrate in an acidic environment, the step of heating said bottom substrate above a clearing point.

33. The invention as set forth in claim 32, further comprising, after the step of contacting said liquid crystal with said bottom substrate, the step of allowing said bottom substrate to slowly cool down and equilibrate, whereby said hybrid aligned nematic cell enters a nematic phase transition before said liquid crystals homeotropically align.

34. A device having homeotropically aligned liquid crystals with respect to a surface of a substrate of said device, said device comprising:
   a film coating on said surface of said substrate;
   wherein said film is anodized in an acidic environment to form a porous layer on said film, said porous layer having elongated pores, each pore having a longitudinal axis, each of said longitudinal axes of said elongated pores being perpendicular to said surface of said substrate;
   a liquid crystal material comprised of elongated molecules having a first portion overlying said porous layer, and a second portion residing within said elongated pores so that said elongated molecules are homeotropically aligned with respect to said surface of said substrate;
   a top substrate overlying said film coating and said first portion of said liquid crystal material; and
   wherein said elongated molecules of said first portion near said top substrate are homogeneously aligned.

35. A method for creating homeotropic alignment, with respect to a surface of a substrate, of liquid crystals within a porous material, comprising the steps of:
   (a) coating said substrate with an aluminum film;
   (b) anodizing said substrate in an acidic environment to form a porous layer having elongated pores in a top region of said aluminum film, wherein each elongated pore has a longitudinal axis, and each of said longitudinal axes of said elongated pores are perpendicular to said surface of said substrate;
   (c) depositing liquid crystal material comprised of elongated molecules onto said porous layer, whereby said liquid crystal flows into said elongated pores by capillary action so that said elongated molecules homeotropically align within said elongated pores, with respect to said surface of said substrate;
   (d) placing a top substrate over said film coating and said first portion of said liquid crystal material; and
   (e) inducing near said top substrate, homogeneous alignment of said elongated molecules of said first portion with respect to said top substrate.

36. A liquid crystal display comprising:
   a) a film located on a surface of a bottom substrate;
   b) the film having pores formed by an anodic process within;
   c) a liquid crystal material covering the pores;
   d) a top substrate covering the liquid crystal material; and
   e) the liquid crystal material being homeotropically aligned within the pores and homogeneously aligned near the top substrate.

37. The liquid crystal display of claim 36 wherein the film comprises a conductive material.

38. The liquid crystal display of claim 36 wherein the film comprises a reflective material.

39. The liquid crystal display of claim 36 wherein the film comprises aluminum.

40. The liquid crystal display of claim 39 wherein the aluminum film is partially anodized to form aluminum oxide.

41. The liquid crystal display of claim 40 wherein a portion of the aluminum film is unanodized so that it reflects light.

42. The liquid crystal display of claim 40 wherein a portion of the aluminum film is unanodized so that it conducts electricity.

43. The liquid crystal display of claim 42, wherein the aluminum forms electrodes, and wherein the application of voltage to the electrodes provides an electric field across the liquid crystal to define pixels.

44. The liquid crystal display of claim 36 wherein the homogeneously aligned liquid crystal material near the top substrate varies smoothly in a splay-bend conformation to homeotropic alignment near the bottom substrate.

45. The liquid crystal display of claim 36 wherein the bottom substrate is a semiconductor.

46. The liquid crystal display of claim 36 wherein the top substrate is a cover glass plate coated with transparent electrode.

* * * * *